US008750420B2

(12) United States Patent  (10) Patent No.: US 8,750,420 B2
Ganter  (45) Date of Patent: Jun. 10, 2014

(54) METHOD AND APPARATUS FOR GENERATING MODULATED RADIO WAVES

(75) Inventor: William A. Ganter, Boulder, CO (US)

(73) Assignee: Custom Link Corporation, Boulder, CO (US)

( * ) Notice: Subject to any disclaimer, the term of this patent is extended or adjusted under 35 U.S.C. 154(b) by 664 days.

(21) Appl. No.: 12/946,200

(22) Filed: Nov. 15, 2010

(65) Prior Publication Data

US 2011/0116576 A1  May 19, 2011

Related U.S. Application Data

(60) Provisional application No. 61/261,558, filed on Nov. 16, 2009.

(51) Int. Cl.
*H04L 27/04* (2006.01)
*H04L 27/36* (2006.01)

(52) U.S. Cl.
USPC ........................................ 375/300; 375/286

(58) Field of Classification Search
CPC .. H04B 14/002; H04B 14/004; H04B 14/023; H04B 14/026; H04L 27/02; H04L 27/04; H04L 27/006

USPC .......................................... 375/286, 289, 300
See application file for complete search history.

(56) References Cited

U.S. PATENT DOCUMENTS

2007/0280333 A1* 12/2007 Abou Rjeily ................. 375/130
2010/0188253 A1*  7/2010 Shearer ...................... 340/853.3
2010/0220825 A1*  9/2010 Dubuc et al. ................. 375/346

* cited by examiner

*Primary Examiner* — Shuwang Liu
*Assistant Examiner* — David Huang
(74) *Attorney, Agent, or Firm* — Frommer Lawrence & Haug LLP; William S. Frommer

(57) ABSTRACT

A transmitter includes an oscillator that generates a clock signal and a mapping unit that maps received data-bits to symbols and designates each of the symbols as three or more signal coding levels, where each of the signal coding levels are represented by a plurality of digital codes. The three or more signal coding levels representing each symbol are DC balanced and include a plurality of peak amplitudes. The transmitter further includes a digital to analog convertor that converts the plurality of digital codes to a corresponding plurality of analog amplitude levels at a rate determined by the clock signal, whereby the analog amplitude levels generate a signal coding level. A filter then smoothes the plurality of analog amplitude levels and generates a modulated carrier wave that is coded by the symbols.

14 Claims, 5 Drawing Sheets

METHOD AND APPARATUS FOR GENERATING MODULATED RADIO WAVES

CROSS-REFERENCE TO RELATED APPLICATIONS

This application claims the benefit under 35 U.S.C. §119 (e) of provisional patent application No. 61/261,558, filed Nov. 16, 2009, the contents of which is incorporated by reference herein in its entirety.

BACKGROUND

1. Field of the Invention

This invention relates generally to generating and receiving modulated carrier waveforms, and more specifically, to optimizing the spectral occupancy of such modulated carrier waveforms.

2. Background Discussion

The demand for wireless data transmission far exceeds the available RF spectrum, especially since usable spectrum is a finite resource. In the United States, the Federal Communications Commission (FCC) has recently unlicensed some frequency bands that were historically reserved and licensed for television broadcast. Unused television channels are called "white space" spectrum. These white space frequencies are now open for unlicensed transmissions in locations where they do not interfere with either licensed television broadcasters or wireless microphones. Moreover, cellular service providers have paid billions of dollars to acquire licensed spectrum at auction. Such prices testify to the enormous value of spectrum and, in particular, the need for its efficient use.

Thus, embodiments of the present invention are, among other things, directed to transmitting high data rate signals that utilize narrow spectrum slices without interfering with other transmissions.

SUMMARY

Accordingly, embodiments of the present invention are directed to a method and apparatus that provides a frequency agile radio system (i.e., implemented entirely in either software, hardware, or any combination of software and hardware) for data transmission, whereby data is coded directly onto a carrier wave rather than by up-converting a baseband signal onto the carrier using, for example, a mixer.

One embodiment of the present invention is directed to a transmitter including an oscillator that generates a clock signal; a mapping unit that maps received data-bits to symbols and designates each of the symbols as at least three signal coding levels such that each of the signal coding levels are represented by a plurality of digital codes, whereby the at least three signal coding levels representing each symbol are DC balanced and include a plurality of peak amplitudes; a digital to analog convertor that converts the plurality of digital codes to a corresponding plurality of analog amplitude levels at a rate determined by the clock signal, where the analog amplitude levels generate a signal coding level; a filter that smoothes the plurality of analog amplitude levels and generates a modulated carrier wave that is coded by the symbols; and an antenna for transmitting the modulated carrier wave.

Another embodiment of the present invention is directed to providing zero crossing points at intervals between each signal coding level is constant.

Yet another embodiment of the present invention is directed to the signal coding levels each including a half cycle of the modulated carrier wave at a defined frequency.

Yet another embodiment of the present invention is directed to the signal coding level including one of a plurality coding areas, where the plurality of coding areas are each designated by a predefined amplitude.

Yet another embodiment of the present invention is directed to a transmitter further including an amplifier operable to amplify the modulated carrier wave that is coded by the symbols.

Yet another embodiment of the present invention is directed to a transmitter including an input interface operable to transfer the data-bits to the mapping unit under synchronization of the oscillator.

Yet another embodiment of the present invention is directed to a method of transmitting data by an antenna. The method includes generating a clock signal; mapping the data to symbols; designating each of the symbols as at least three signal coding levels; representing each of the signal coding levels by a plurality of digital codes, wherein the at least three signal coding levels representing each symbol are DC balanced and include a plurality of peak amplitudes; converting the plurality of digital codes to a corresponding plurality of analog amplitude levels at a rate determined by the generated clock signal; generating a signal coding level based on the plurality of analog amplitude levels; and filtering the plurality of analog amplitude levels for generating a modulated carrier wave that is coded by the symbols.

Yet another embodiment of the present invention is directed to a receiver that includes an antenna operable to receive a composite signal including a directly coded carrier wave signal and at least one other radio signal. An analog to digital (A/D) convertor samples the received composite signal and provides a plurality of A/D samples. A processor device then processes the plurality of A/D samples and generates a plurality of modified A/D samples, where the plurality of modified A/D samples are generated by subtracting any effects of the at least one other radio signal on the directly coded carrier wave signal from the plurality of A/D samples. A logic block utilizes the plurality of modified A/D samples to access coding levels corresponding to the directly coded carrier wave signal and maps the coding levels to data symbols.

Yet another embodiment of the present invention is directed to a method of receiving data. The method comprises receiving a composite signal including a directly coded carrier wave signal and at least one other radio signal; sampling the received composite signal and provide a plurality of A/D samples; generating a plurality of modified A/D samples based on the plurality of A/D samples by subtracting any effects of the at least one other radio signal on the directly coded carrier wave signal; accessing, using the plurality of modified A/D samples, coding levels corresponding to the directly coded carrier wave signal; and mapping the coding levels to data symbols.

Yet another embodiment of the present invention is directed to the method of receiving data, whereby the data symbols are outputted.

Yet another embodiment of the present invention is directed to the method of receiving data, which further includes monitoring any signal level activity for the at least one other radio signal for detecting whether the at least one other radio signal has dropped.

Yet another embodiment of the present invention is directed to the method of receiving data, which further includes monitoring any signal level activity for a newly transmitted signal appearing within the frequency band of the directly coded carrier wave signal.

Yet another embodiment of the present invention is directed to the method of receiving data, which further includes identifying the presence of the directly coded carrier wave signal within the composite signal by detecting: the amplitude of the directly coded carrier wave signal; the amplitude of the at least one other radio signal; the frequency of the at least one other radio signal; the phase relationship between the directly coded carrier wave signal and the at least one other radio signal; and an analog to digital (A/D) sampling offset associated with the coding levels corresponding to the directly coded carrier wave signal.

Yet another embodiment of the present invention is directed to the method of receiving data, whereby when an additional radio signal is present within the composite signal, the amplitude of the additional radio signal is detected; the frequency of the additional radio signal is detected; and the phase relationship between the directly coded carrier wave signal and the additional radio signal is detected.

Other embodiments of the present invention include the methods described above but implemented using one or more apparatuses or programmed as computer code to be executed by one or more processors operating in conjunction with one or more electronic storage media.

BRIEF DESCRIPTION OF THE DRAWINGS

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which.

DETAILED DESCRIPTION

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The direct coding of a carrier wave (i.e., Power Modulation Radio) according to the embodiments of the present invention provide several characteristics. For example, the data rate is now proportional to the carrier frequency, which is always considerably higher than a baseband frequency. Also, the portion of spectrum occupied by the directly coded carrier is the spectral occupancy of the carrier wave, and not the carrier wave plus the generated sidebands produced by modulating the baseband signal onto the carrier. The data rate is always different with respect to every carrier frequency and, therefore, it is not a standard data rate. Additionally, commonly practiced filter tuning time may average away the coding on the carrier wave, thus, rendering it undetectable. However, according to the exemplary embodiments described and illustrated herein, a computational method (i.e., a virtual waveguide) may overcome the above stated limitations in filtering. The computational method has the same effect as if the directly coded carrier wave was passed through a narrow band physical waveguide.

Figure 1:
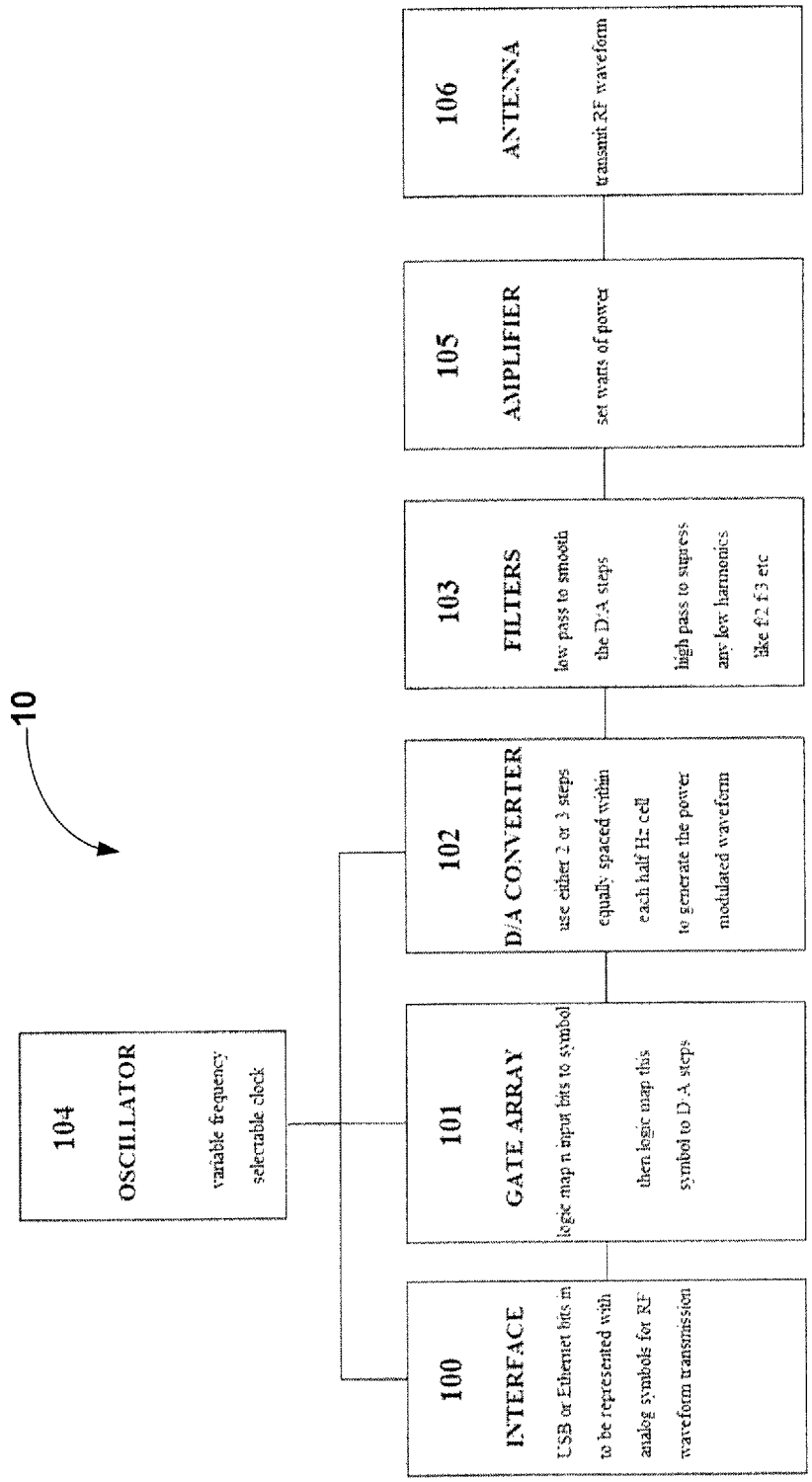
FIG. 1 illustrates a block diagram of a transmitter unit according to an embodiment of the present invention.

FIG. 1 illustrates a block diagram of a transmitter unit 10 according to an embodiment of the present invention. The transmitter unit 10 includes an interface 100, a gate array logic block 101, a Digital to Analog (D/A) convertor 102 (e.g., 10-bit resolution producing +/−512 levels), low-pass and high-pass filters 103 (filter block), an oscillator 104, an amplifier 105, and a transmitter antenna 106. These components of the transmitter 10 may be realized entirely in hardware, entirely in software, or as a combination of both hardware and software components. According to a preferred embodiment, the transmitter unit 10 may be implemented almost entirely as computational software, with the exception of the transmitter antenna.

Figure 3:
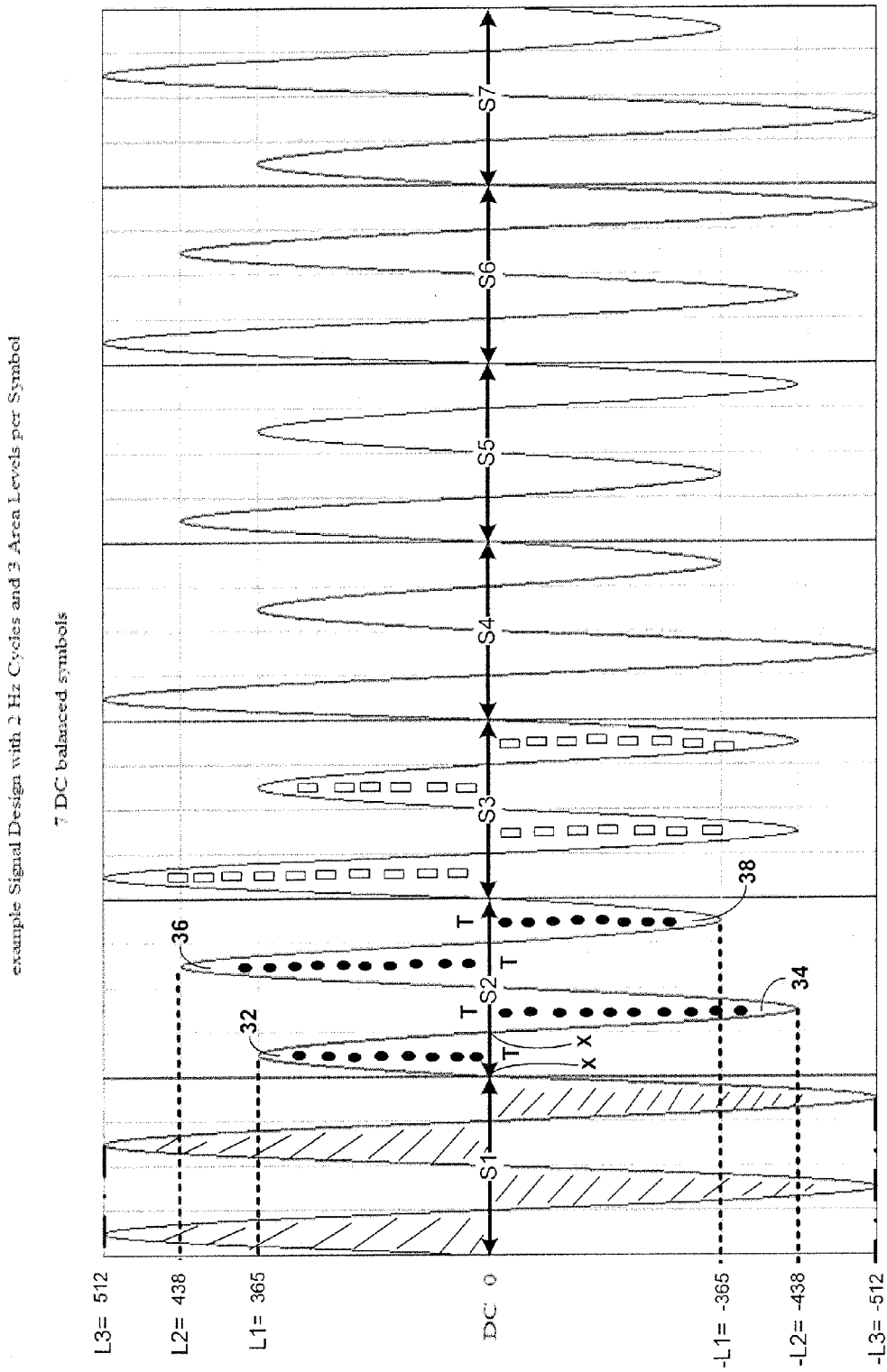
FIG. 3 is an exemplary directly coded carrier wave generated according to an embodiment of the present invention.

The operation of the transmitter unit 10 with be described with the aid of the generated modulated carrier wave illustrated in FIG. 3. Oscillator 104 may be a selectable variable frequency clock generator. As the oscillator's 104 selectable frequency is increased, the generated modulated carrier wave frequency is also increased in proportion. As shown in FIG. 1, the oscillator 104 is coupled to, and synchronizes, the operation of interface 100, gate array logic block 101, and the D/A convertor 102. The interface 100 may receive Universal Serial Bus (USB) or Ethernet data bits that are to be directly coded onto the carrier wave as symbols. At the gate array logic block 101, the USB or Ethernet data bits received from the interface 100 are mapped as n-bit symbols. The gate array logic block 101 includes a look-up table that maps each of the n-bit symbols to one or more D/A steps (i.e., digital-bits corresponding to an analog output voltage). Each of the D/A steps generated by the look-up table of the gate array logic block 101 is then received and converted to a corresponding analog voltage by the D/A convertor 102. The requisite directly coded carrier wave is produced as result of filtering the analog voltages that are generated by the D/A convertor 102. Consequently, the D/A convertor's 102 outputted analog voltages are applied to the low-pass filter of filter block 103. By low-pass filtering the analog voltages that are generated by the D/A convertor 102, the voltage transitions between each of the D/A steps is smoothed. This accordingly results in generating a smooth modulated carrier wave. An example of such a smooth modulated carrier wave is shown in FIG. 3, whereby the symbols are directed encoded onto the carrier, as will be described in the following paragraphs.

In addition, the D/A convertor's 102 outputted analog voltages are also applied to the high-pass filter of filter block 103. The effect of this filtering is to suppress any low frequency harmonics that are present at f/2 or f/3 (i.e., f=clock frequency) due to repetitive patterns that may be present in the input data bits received by the interface 100. The filtered modulated carrier wave is then amplified by amplifier 105 prior to being transmitted by the antenna 106.

Figure 2:
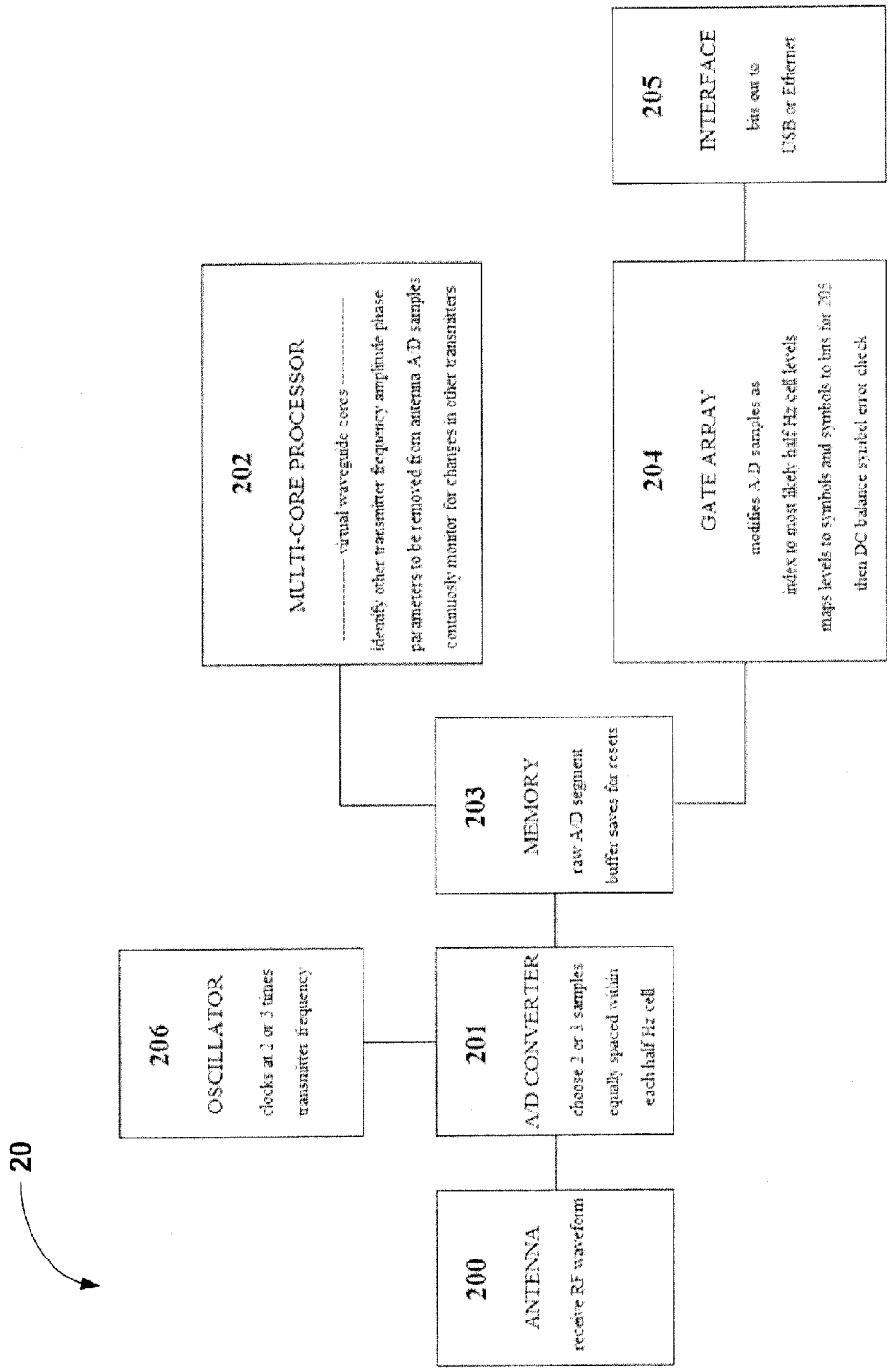
FIG. 2 illustrates a block diagram of a receiver unit according to an embodiment of the present invention.

A directly encoded carrier signal (e.g., FIG. 3) that is generated according to the embodiments of the present invention (e.g., FIG. 1) may be detected by a receiver using a software computational detector. An embodiment of a receiver 20 utilizing such a software computational detector is illustrated in FIG. 2. The directly encoded carrier wave signal described according to the embodiments of the present invention include characteristics such as: (1) providing defined coding levels in each cell (i.e., defined as a ½ cycle); (2) coding symbols using n bits; (3) generating a smooth AC waveform amplitude at the DC level (0 volts AC) at every symbol boundary; (4) designating area coding levels in each cell; (5) generating DC balanced symbols (sum of the cell areas in each symbol equal zero volts); and (6) generating equally spaced AC zero crossing point at every half Hz cell, which avoids an increase in the spectral occupancy of the directly encoded carrier wave signal.

Referring to FIG. 3, the directly encoded carrier signal includes seven symbols denoted S1-S7. Each symbol has been designated to span four half cycles, where two of the half cycles are positive and two of the other half cycles are negative. Each of the half cycles is defined as a cell and, therefore, each symbol is represented by four cells. The amplitude of each cell is set to vary according to three A/D levels corresponding to a digital word value of 365 (level 1), a digital word value of 438 (level 2), and a digital word value of 512 (level 3). Since each cell has three (3) levels and each symbol has four (4) cells, the total number of data symbols are: $3 \times 3 \times 3 \times 3 = 3^4 = 81$. However, in order for each symbol to be DC balanced, the total sum of the cell areas in each symbol must equal zero. Therefore, from among a possible 81 data symbols, only 19 symbols are DC balanced, whereby 16 of these symbols are assigned for data and the remaining 3 symbols are reserved for communication link control purposes. The 16 DC balanced symbols may each represent a 4-bit binary word (i.e., $2^4=16$). Therefore, the levels chosen for each cell within a symbol (i.e., 4-cells) are all DC balanced and represent one of the 19 DC balanced symbols. It will be appreciated that vertical scale of the exemplary waveform of FIG. 3 has not been drawn to scale.

The number of levels and cells per symbol may be varied according to how many bit/symbol are desired. For instance, consider designating six (6) cells (i.e., 3 cycles) as a symbol whereby within each cell there are four (4) possible levels. Under this scheme, the total number of data symbols are: $4 \times 4 \times 4 \times 4 \times 4 \times 4 = 4^6 = 4096$. As indicated previously, not all possible data symbols provide a DC balanced symbol. Therefore, for among the 4096 available data symbols, are DC balanced. Based on the 580 DC balanced symbols, 512 symbols are utilized for data and the remaining 68 symbols are assigned for communication link control purposes. The 512 symbols generated by the directly coded carrier wave represent a 9-bit binary word (i.e., $2^9=512$). It should be appreciated that the above examples and preferred signal designs may not exclude other designs that comply with the smooth waveform, constant zero crossing, and DC balanced area characteristics of the present invention.

Although the number of levels and cells per symbol may be varied according to how many bits/symbol are desired, the direct coding of the carrier results in a modulation and demodulation process that occurs at speeds (e.g., sampling and clock rates) that are either the same or higher than the carrier frequency. For example, a 100 MHz carrier has a cycle duration of 10 nsec. Therefore, a half cycle duration representing a cell has a time-duration of 5 nsec. For example, if the gate array logic block 101 includes a look-up table that represents each cell level within a symbol as 3-D/A steps, the oscillator must at least operate at a speed that is capable of sampling the 5 nsec cell (i.e., a ½ cycle) three times. This corresponds to sampling the cell at an oscillator frequency of 3 times ⅕ nsec, which corresponds to 600 Mhz. Thus, as the processing speeds of microprocessor type devices increase (e.g., GHz multi-core processors), so does the capacity of transmitting directly coded carrier waves at increased data rates. However, while the directly coded carrier waves experience increased data rates, their respective spectral widths remain governed by the spectral characteristics of the carrier and not a function of modulated information or data rates. Thus, as previously stated, the directly coded carrier waves are able to utilize narrow spectral gaps of un-utilized channels within the radio spectrum independently of the data rates associated with the information encoded onto the carrier.

A carrier waveform is generally a pure sine wave. A directly coded carrier wave (i.e., a power modulated carrier waveform) according to the present invention is sine-like, but varies from a pure sine in order to maintain a constant time interval between zero crossings points during coding level changes. For example, referring to FIG. 3, in symbol S2, cell 32 has a level (i.e., L1) corresponding to digital value 365, while cell 34 has a level (i.e., -L2) corresponding to digital value -438. Cell 36 has a level (i.e., L2) corresponding to digital value 438, while cell 38 has a level (i.e., L1) corresponding to digital value -365. Regardless of the respective changes in cell levels, each of the cells 32-38 have a constant time interval "T" between zero crossings points "X". As described above, the directly coded carrier wave is generated in a manner that ensures that the symbols are DC balanced. This ensures that at the receiver, a full range of the Analog to Digital (A/D) convertor can be used. For example, in symbol S2, cells 32 and 38 have amplitude levels that cancel each other out. Similarly, the amplitude levels of cells 34 and 36 also cancel each other out. Thus, the DC level for the cells corresponding to symbol S2 is zero. This applies to all the other symbols (i.e., symbol S1 and S3-S7).

Data block header symbols within the directly coded carrier wave are utilized in the detection process in order to identify/detect the directly coded carrier wave from among other signals and/or noise that are occupying the same or partially the same frequency location as that of the directly coded carrier wave. According to an embodiment of the present invention, the header symbols are pure sine waves since the cell levels are constant. For example, in FIG. 3, symbol S1 may be a header symbol since its cell levels are constant at levels L3 and -L3.

As explained above, each of the D/A steps generated by the look-up table of the gate array logic block 101 (FIG. 1) is received and converted to a corresponding analog voltage by the D/A convertor 102. For example, two or three D/A steps may be used to generate each cell within a symbol prior to producing the requisite cells for constructing the directly coded carrier wave. It will be appreciated that four or more D/A steps may be used to generate each cell within a symbol having a predefined level. The more D/A steps used, the more processing speed is required at both the transmitter and receiver side. However, by increasing the D/A steps, the resolution of the constructed cells is also increased, which leads to a less stringent low-pass filtering requirement.

Defining D/A steps so as to both maintain a designated cell level area (e.g., see FIG. 3; symbol S2, cell 32, cell level L1=365) and to assure an equally spaced zero crossing for each cell (e.g., see FIG. 3; symbol S2, interval T), may require experimental verification. The symmetric control symbols (e.g., header symbol) are pure sinusoids and thus trivial to code into steps. Three D/A steps per cell may be preferred and is usually required in order to satisfy the required conditions for generating the directly coded carrier wave. For example, for three designated D/A steps per cell, the equally spaced locations would be at $\pi/6$, $3\pi/6$ and $5\pi/6$, whereby each of these equally spaced locations respectively includes sine values of 0.5, 1.0, and 0.5 times their amplitude. For the 3 designated area levels (designated as area coding levels 1, 2, & 3), there are exactly 27 (3×3×3) possible cases to estimate and then fine adjust. However, only fifteen (15) of these are actually unique due to symmetry, and three (3) are pure sine cases. The fifteen (15) cases for step design which vary from pure sinusoids are coding levels: "112, 113, 221, 223, 331, 332, 121, 131, 212, 232, 313, 323, 123, 213, & 132." The 9 symmetric patterns to the above are: "211, 311, 322, 122, 233, 133, 321, 312, & 231." In total, the fifteen (15) unique, nine (9) symmetric, and the 3 pure sinusoids account for all 27 possible combinations. It will be noted that each 3-digit number represent a coding level for three cells. For example, 112 refers to a first cell having a coding level of 1, a second adjacent cell having a coding level of 1 a third adjacent cell having a coding level of 2.

For a level 1 (lowest level) cell, for example, in a cell sequence of −3, 1, −3, the first and third D/A steps should be symmetric but higher than a pure sinusoid of 0.5 times its cell amplitude, while the center D/A step should be lower than the pure sinusoid of 1.0 times its cell amplitude. For a similar symmetric −2, 1, −2 cell sequence, the first and third D/A steps should be not quite as high as in the −3, 1, −3 case, while the center step should be slightly higher towards 1.0 than in the −3, 1, −3 case. Non-symmetric cell sequences like −3, 1, −2 should have the first step higher than the third step, with the second step just slightly below 1.0, somewhat tilting the cell waveform. On a first pass these values may include a first step at 0.59 (greater than 0.5), a second center step at 0.87 (lower than 1.0), and a third step at 0.54 (higher than 0.5). Note that the sum of these steps is: 0.59+0.87+0.54=2.0, whereby a sum of steps equal to 2 represents a pure sinusoid. When the difference between the area coding levels gets smaller, as in the 5:6:7 ratio shown in FIG. 3, then the D/A steps more closely approach the pure sinusoid D/A steps of 0.5, 1.0, 0.5, which have a sum of 2.0. It should appreciated that the D/A steps for a 3, −2, 3 cell sequence are sign symmetric to a −3, 2, −3 cell sequence. Thus, the D/A step tables within gate array logic block 101 (FIG. 1) need to be fine tuned and carefully measured experimentally, as they will be affected by the actual D/A 102 and low pass smoothing filter components 103.

FIG. 2 illustrates a block diagram of a receiver unit 20 according to an embodiment of the present invention. The receiver unit 20 includes an antenna unit 200, an analog to digital convertor (A/D) 201, an oscillator 206, a memory unit 203, a processor device 202, a gate array logic block 204, and an interface 205. The directly coded waveform received by antenna 200 is digitally sampled in the A/D converter 201 at a rate controlled by oscillator 206. These A/D samples are stored in memory unit 203, which are continuously accessed by both the processor device 202 and gate array logic block 204. Computations are performed on these A/D samples by processor 202 to 'virtually tune' (as opposed to actually tune) to the received directly coded waveform by identifying and monitoring the parameters of other transmissions being simultaneously received by the antenna 200. This processing enables the A/D samples corresponding to other signal received from other transmitters to be subtracted out in the gate array logic block 204, which produces modified A/D samples that can be indexed from a likelihood table in order to estimate a cell area coding level. The real time logic in the gate array logic block 204 then maps these corrected levels into symbols, where these symbols are further mapped back into the originally transmitted bits that were directly coded onto the carrier waveform (i.e., the Power Modulation Radio transmission). Finally, interface 205 passes these detected bits to the user.

A computational tuner in the processor device 202 is of necessity for receiving directly coded carrier waves. This is because the data coding is directly applied to the carrier and is not modulated onto the carrier as a baseband frequency. Consider an FM radio transmission on an assigned 100 MHz carrier, where its audio content is coded in a baseband of less than 20 KHz. Its FM carrier is 100,000 KHz which is 5,000 times higher in frequency than the coded audio content. Thus, from the perspective of a computational tuner, the rate of change in frequency and amplitude is less than 1 part in 5,000, hence making it relatively easy to track and adjust for in the monitoring process in a processor 202. Similarly an AM radio station at 1 MHz frequency changes in amplitude at the rate of less than 1 part in 50. Cellular voice calls on a 900 MHz carrier may only have about 3 KHz of baseband coding and thus change at the rate of 1 part in 300,000. Hence filters can time average tune cellular calls very narrowly, thus allowing many sub channels for many simultaneous callers connected to that cell tower.

In contrast, a directly coded carrier waveform transmission at 200 MHz has a 5 nsec cycle, where its half cell coding level changes every 2.5 nsec. Time phase filters intended for use with a much slower changing baseband coding will average out this modulation, leaving only the carrier with no detectable coding. Thus, the computational tuner (called the virtual waveguide) within the processor device 202 performs the requisite processing, as described in the following paragraphs.

Figure 5:
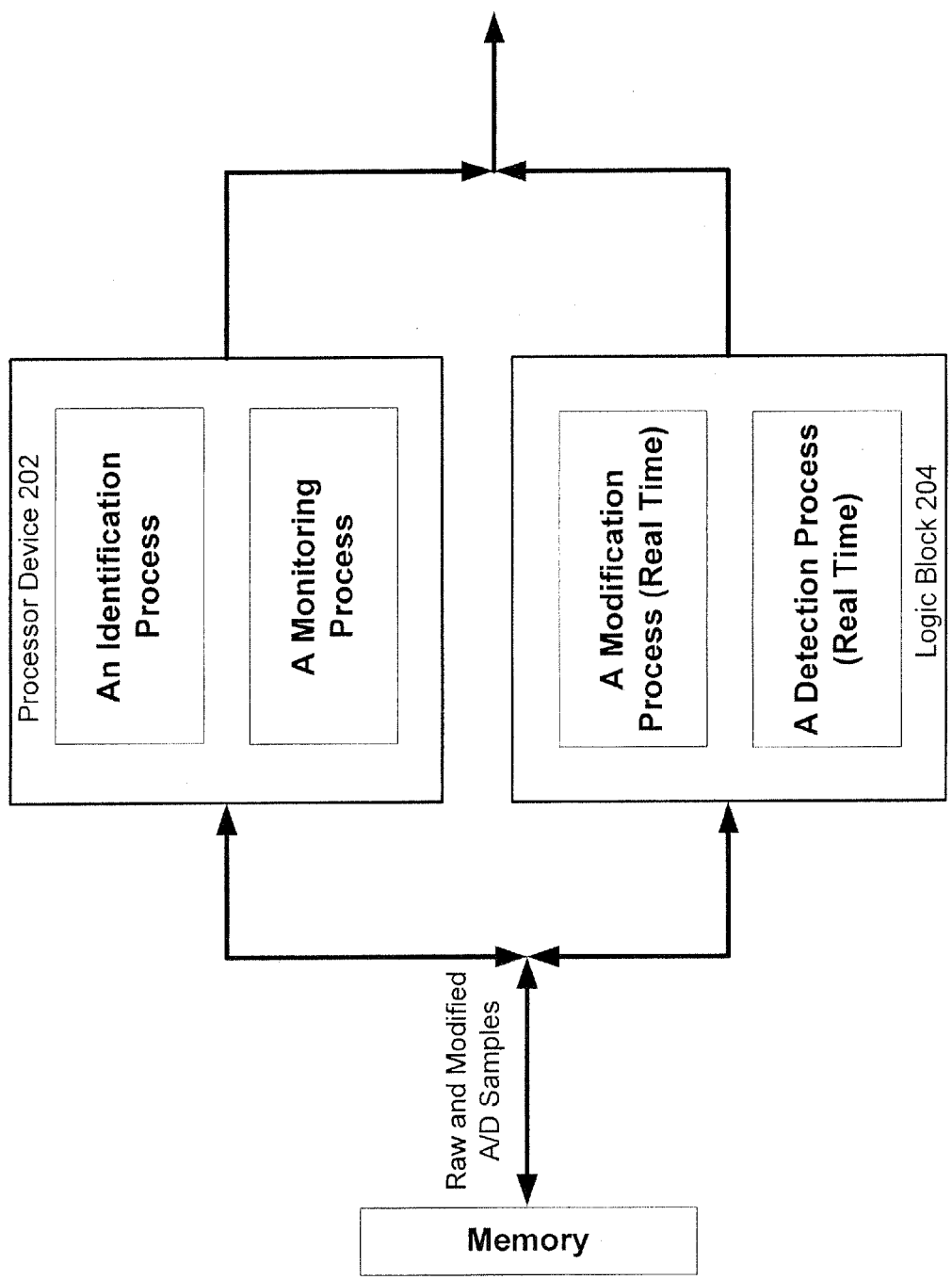
FIG. 5 illustrates a functional block diagram of the processes carried out within the receiver shown in FIG. 2 according to an embodiment of the invention.

According to the embodiments of the present invention described herein and illustrated in FIG. 5, four processes (e.g., generated via software, hardware, firmware, or any combination thereof) occur within the receiver 20, which are: (1) an identification process executed within processor device 202, (2) a monitoring process also carried out within processor device 202, (3) a modification process handled by the gate array logic block 204 in real time, and (4) a detection process also handled by the gate array logic block 204 in real time. The identification and monitoring processes utilize processor device 202. These are not real-time processes. The modification and detection processes do, however, run in real-time, and are encoded in parallel logic within gate array logic block 204. The processes in device 202 and gate array 204 communicate by setting states in a segment of shared memory within memory unit 203. In a preferred embodiment, the identification and monitoring processes may be executed as one or more software programs executing on processor device 202.

Figure 4:
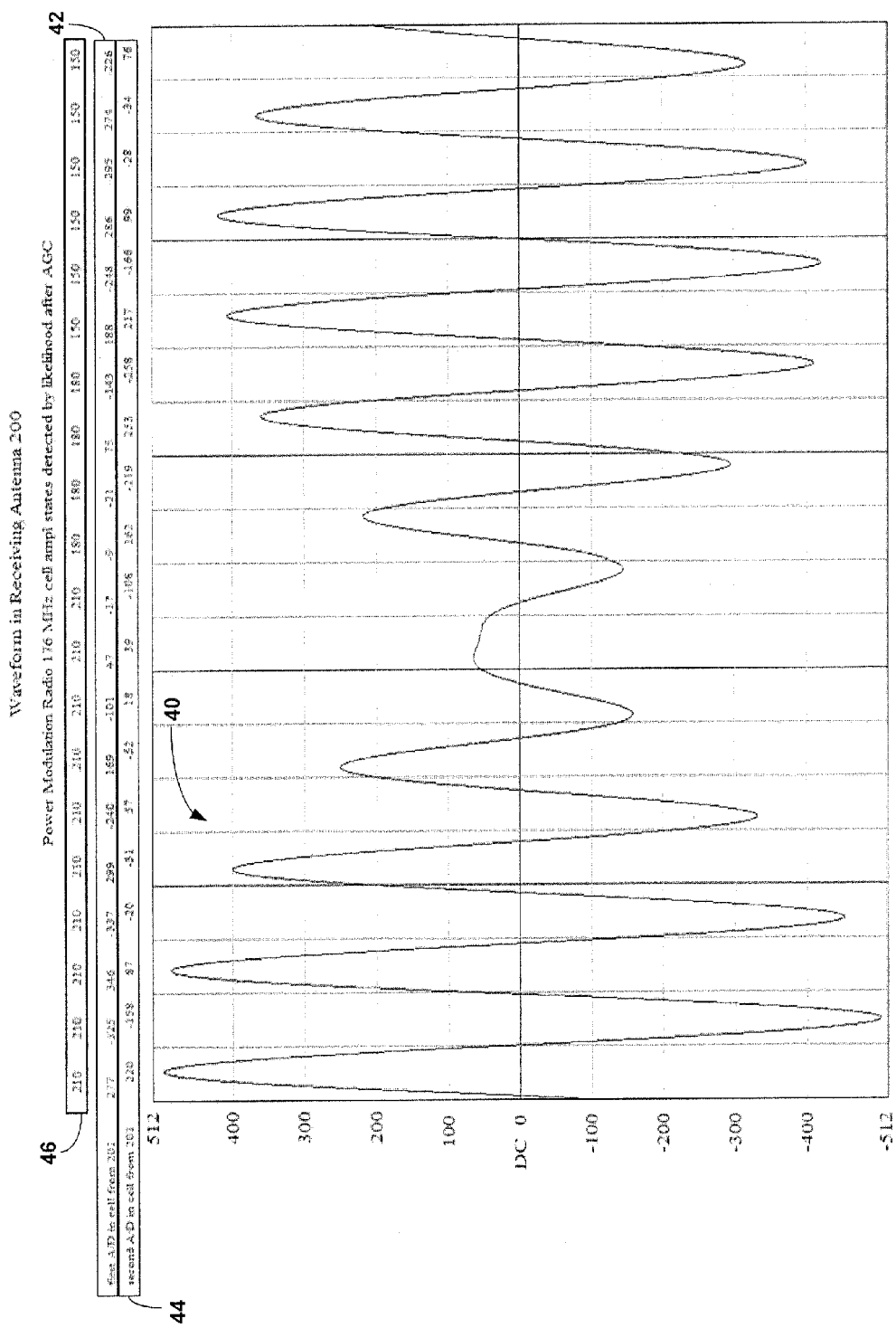
FIG. 4 is an exemplary waveform received by the receiver unit of FIG. 2 according to an embodiment of the present invention.

The software identification process is explained with the aid of the exemplary waveform 40 illustrated in FIG. 4, where FIG. 4 illustrates a waveform received by the antenna unit 200 of the receiver 20 (FIG. 2) according to an embodiment of the present invention. In this example, the waveform depicted in FIG. 4 is a composite signal that includes a directly coded carrier wave signal of a known frequency of 176 MHz and unknown received amplitude, and another transmitter signal of an unknown amplitude, frequency, and unknown phase relative to the 176 MHz directly coded carrier wave signal. The A/D samples obtained from the antenna 200 have an unknown sampling position within the cells of the 176 MHz directly coded carrier wave signal. The horizontal grid in FIG. 4 defines 20 half Hz cells of the 176 MHz signal. No real world background noise has been included in FIG. 4, simply for clarity. The vertical scale of +/−512 corresponds to the 10-bit resolution associated with the quantized output range of the A/D convertor 201, which is the same range as the scale illustrated in FIG. 3. Also, the 3 area coding levels have the same 5:6:7 ratio, however, here they are designated as 150, 180 and 210 A/D units. The 176 MHz directly coded carrier wave signal in this example had a data rate of: 176 MHz×2 bps/Hz=352 Mbps.

There is no component within the receiver 20 of FIG. 2 that could synchronize the A/D converter 201 to a directly coded carrier wave signal (i.e., a Power Modulation Radio transmission) because other transmissions and background noise will also be received by the antenna 200 and superimposed with the directly coded carrier wave signal. In FIG. 4, for example, 2 A/D samples may be used per cell (i.e., a ½ cycle of the wave). It will, however, be appreciated that more than 2 samples may be used, and that more samples would be helpful in a poor signal to noise environment for the purpose of averaging out some of the background random noise.

The identification process of the computational tuner needs to resolve five (5) unknowns in the example waveform provided in FIG. 4. The A/D values (i.e., 2 per cell) for use in the identification process are displayed in FIG. 4 and labeled as first A/D samples 42 and second A/D samples 44, which are received from the A/D convertor 201 (FIG. 2) that follows the antenna 200. The five (5) unknown variables to be determined by computation are: (A) the amplitude of the directly coded carrier wave signal, (B) the frequency of the other transmission's frequency, (C) the amplitude of the other transmission, (D) the phase of the other transmission relative to the directly coded carrier wave signal, and (E) the A/D sampling offset in the cells of the received directly coded carrier wave signal. Three parameters (A-D) are required for each transmitted signal that is received by the receiving antenna 200. Specifically, for each transmitted signal received by the antenna along with the directly coded carrier wave signal, the transmitted signal's frequency, amplitude, and phase relative to the directly coded carrier wave signal should be detected. The FIG. 4 example contains only one other transmitted signal. If there had been two other transmitted signals, then the number of unknowns would be eight (8) instead of (5). The amplitude of the directly coded carrier wave signal is always unknown due to radio propagation fading and because the antenna signal will be fully gain adjusted in order to best utilize the 10-bit A/D dynamic range, especially since each of the other transmitted signals have a different signal strength which can be stronger or weaker relative to that of the directly coded carrier wave signal.

When the antenna 200 receives a waveform with two or more other transmissions, the identification process is further complicated. Rather, the identification process will require more seconds to accomplish. However, the agile directly coded carrier wave signal may explore transmitting, via the programmable (tunable) clock oscillator 104 (FIG. 1), at other frequencies that are more favorable, and may therefore use alternate antenna bands.

The five (5) unknowns described in relation to FIG. 4 may be found by an iterative search that is combined with trend analysis for obtaining a best goodness of fit. This process is referred to as the identification process. A zero goodness of fit would mean that all of the unknowns had been precisely found, which in practice is not entirely the case due to factors such as, but not limited to, noise, the quantized A/D sample values, the math precision of the software processor and data types, and the discrete resolution of the iterative search algorithm. Detection by likelihood of the cell area levels is quite robust, so a near zero goodness of fit is typically not required, as long as no trends are present within the noise. The incrementing procedure described in relation to the identification process is a large scale estimation problem, but with high performance processors such processor device 202 (FIG. 2), the task duration is measured in only a few seconds. The directly coded carrier wave signal continues to transmit a header of known frequency and known constant amplitude throughout the identification process. The other transmitted signal is assumed to hold steady on frequency, amplitude and phase throughout the identification process due to its baseband coding that would change little relative to the A/D sampling interval.

The identification process for the waveform 40 illustrated in FIG. 4 found the 176 MHz directly coded carrier wave signal amplitude to be 210 in A/D amplitude. The identification process also found the other transmitted signal to have a frequency of 200.1 MHz, an A/D amplitude of 166.7, and a relative phase offset (i.e., compared to the directly coded carrier wave signal) of −0.153π. The A/D offset position was also found to be delayed by 0.078π. The final goodness of fit from the procedure in this example was 0.335 above a perfect zero, which implies that exceptional identification has been achieved. The exact values used to build the FIG. 4 example provided a goodness of fit at 0.189 instead of 0.0 due to the quantized A/D sample values and the identification procedure used.

Regarding FIG. 4, each A/D sample has content from the transmitted 176 MHz directly coded carrier wave and the other transmitted signal received at the antenna 200 (FIG. 2). The formula for such an A/D value is:

$$A/D = 176\text{ MHz signal amplitude} \times \sin(\text{location}) + \text{other transmitted signal amplitude} \times \sin(\text{relative phase}), \quad \text{Formula (1)}$$

where the location is $\pi/4 + \text{offset} \times \pi$ and the relative phase has an initial location and then an increment proportional to the frequency of the other transmitted signal. An example of the iterative search is shown below.

The example procedure below averages the results over the first 8 cells in FIG. 4 by using the first 16 A/D samples (i.e., 2 samples per cell). The first trial values shown are: 200 for the amplitude (i.e., A/D unit amplitude) of the 176 MHz directly coded carrier wave, an offset at 0.05×π, a relative phase at −0.1, the other transmitted signal having an amplitude of 150 (i.e., A/D unit amplitude) and a relative frequency at 1.2 times the 176 MHz directly coded carrier wave. Here, the goodness of fit average absolute deviation from the 16 A/D samples in Formula (1) was 93.7, which is well above 0.0. Raising the 176 MHz wave amplitude to 210, while holding all other trial parameter values the same, lowered the goodness of fit to 89.6, indicating that 210 is a better trial value than 200. Third, trying a relative frequency at 1.15 times the 176 MHz directly coded carrier wave dropped the goodness of fit to 32.8. Again all other values were held the same while the relative frequency was changed (i.e., looking for a trend). Continuing with a next increment on the relative frequency from 1.15 to 1.13 further dropped the goodness of fit down to 17.6. This confirms a favorable trend. By raising the other transmitted signal amplitude to 160, while keeping all the other trial parameters constant, the goodness of fit value further dropped to 11.7. This approach utilizes varying one variable at a time to observe whether a trend may be established. When little improvement results, another one of the five (5) variables (i.e., A-D) is selected and varied. The goodness of fit responds to some of the variables more than others. The amplitude value of 210 for the 176 MHz directly coded carrier wave signal, the amplitude value of 167 for other transmitted signal amplitude, the 1.135 factor for the relative frequency difference between the signals, the $0.08\pi$ for the A/D offset, and the $-0.15\pi$ for relative phase between the signals give a goodness of fit of 3.8, which is indicative of getting closer to the correct parameter values being searched for. Varying the A/D offset to $0.077\pi$ and the relative phase to $-0.153\pi$ provides a goodness of fit that is further desirably reduced to 0.274. Fine trend searching may hone in closer to the best goodness of fit values.

As illustrated in FIG. 4, the identification process found the parameters to be an amplitude of 210 for the 176 MHz directly coded carrier wave signal, an amplitude of 166.7 and a frequency of 200.1 MHz for the other transmitted signal, an $0.078\pi$ A/D position offset, and a $-0.153\pi$ relative phase. The final goodness of fit was thus calculated to be 0.336. Based on the above calculation in the previous paragraph, it is suggested that the selected 167 amplitude was a preferred amplitude than the 166.7 amplitude, and the selected $0.077\pi$ offset was a better chosen offset than the $0.078\pi$ offset. These parameters are then used in Formula (1) above to show the numerical values of the final goodness of fit.

There is an increment associated with moving from A/D sample '1" to A/D sample '16'. The other 200.1 MHz transmitted signal is at a higher frequency relative to the frequency of the directly coded carrier wave signal (i.e., 176 MHz), so its increment is proportional to: $0.5 \times 200.1/176 = 0.5685$, whereby the general expression is given by:

$$\frac{\text{Other Transmitted Signal Frequency}}{\text{Number of } A/D \text{ Samples per Cell} \times \text{Frequency of the Directly Coded Carrier Wave Signal}}$$

The starting phase was found to be $0.198\pi$. It is related by formula to relative frequency and A/D offset parameters as follows. The search found the other transmitted signal at 200.1 MHz to be early in the 176 MHz signal's cell by $-0.153\pi$. Also, the position of the first A/D sample was found to be $0.25\pi + 0.078\pi = 0.328\pi$. To establish the starting increment in terms of the other transmitted signal, we use: $(0.328\pi - 0.153\pi) \times 200.1/176 = 0.1989 \pi$.

Using the goodness of fit formula, the first, second, and third A/D samples are then respectively calculated as follows:

$$277 - 210 \times \text{sine}((0.25+0.078) \times \pi) - 166.7 \times \text{sine}(0.1989 \times \pi) = 277 - 180.08 - 97.52 = -0.60$$

$$220 - 210 \times \text{sine}((075+0.078) \times \pi) - 166.7 \times \text{sine}((0.1989 + 0.5685) \times \pi) = 220 - 108.03 - 111.26 = 0.71$$

$$325 - 210 \times \text{sine}((1.25+0.078) \times \pi) - 166.7 \times \text{sine}((0.1989 + 1.1370) \times \pi) = -325 + 180.08 + 145.03 = 0.11$$

The absolute deviation values here are $(0.60+0.71+0.11=1.42)$, which has an average of $1.42/3 = 0.473$. Therefore, some of the other deviations are less, which results in the 16 sample average of 0.336.

The first eight (8) cells in FIG. 4 contained the 176 MHz header at 210 A/D units. Three data symbols with four (4) cells each follow. Those symbols have cells as follows: two (2) at 210 A/D units, four (4) at 180 A/D units, and the final six (6) cells at 150 A/D units. The cell values actually detected by likelihood index in real time gate array logic block 204 (FIG. 2) are displayed directly above these cells in FIG. 4, as indicated at 46. Those 210, 180, and 150 values were shown to scale in FIG. 4, but in the gate array logic block 204 they would be represented as binary 1 (01), 2 (10) and 3 (11) for those designated cell levels.

The ongoing monitoring process tracks the other transmitted signal for detecting any changes. The ongoing monitoring process operates in the same manner as the identification process, except that it is performed on a sampling basis. The monitoring, however, already knows the found parameters of the other transmitted signal. Because this monitoring cannot keep up in real time, it acquires a set of A/D values spanning four (4) cells that constitutes a directly coded carrier wave symbol. The first (1) step uses the modified values corresponding to the raw A/D samples to detect the symbol. The second (2) step is to subtract the modified values from the raw values. The third step (3) uses the presently found parameters to subtract the other transmitted signal from the second step values, leaving a residual value as a monitoring goodness of fit. This value is saved for the trend analysis. A fine search can be incremented around the found values to see if the monitoring goodness fit can be improved. Any apparent improved found values are saved for the trend analysis. The fourth (4) step is the trend analysis. When a trend is determined to be real, as opposed to being the result of antenna received noise, on a found value, then the trend value replaces the found value. It is then made active in the real time modification process by updating the present active or working value in memory 203 (FIG. 2). An example of a trend parameter is an FM transmitter that is expected to slowly modulate in frequency. Another is an increment that was not found exactly, and will necessarily drift in a large number of A/D samples, and should be adjusted. The monitoring process then acquires a next set of four (4) A/D samples when ready, and repeats steps (1) through (4) above, as described above.

One, two, or three other transmitted signals may be monitored with the above steps. This requires more processing time, and hence longer cycles between new samples to analyze. This is less of a challenge in stable environments with the same other transmitted signals, or where basebands are slowly changing. An abrupt drop of another transmitted signal's amplitude toward zero means that transmitter has stopped sending. A sudden increase in the goodness of fit trend suggests that a new transmitted signal has started up. Changes that cannot be fixed from trends require a signal to halt transmission and start sending only the header for a new identification process. The new process should take much less time if only one other transmitted signal has changed. During this time, until the header appears, the A/D samples can be saved in a buffer segment in memory 203 as they may be corrected with the new found parameters and will not need to be retransmitted. An example of a scenario that is easier to monitor may arise by choosing to transmit a directly coded carrier wave signal at 85 MHz while already knowing that FM broadcast stations at 90.2 MHz and 93.7 MHz will also be received by the antenna 200. Also, as previously described, an FM station rate of change in frequency per its frequency modulation coding around its center frequency would be less than 1 part in 5000. Tracking such relatively slow movement can readily be accomplished within processor device 202. Another easier case is transmitting a directly coded carrier wave signal in a narrow licensed frequency channel, and having prior knowledge of the frequency of the other adjacent licensed channels as opposed to widely searching for them.

The channel monitoring in processor 202 may also need to recognize any new transmitted signals that are appearing and/or departing. A departing other transmitted signal's current amplitude estimate will approach zero. A new other transmitted signal appearing at the 200 antenna would instantly raise the current goodness of fit measure as an alarm. Thus, a directly coded carrier wave system always needs to continually monitor signal activity across their receiver antenna's sensitivity bands, and accordingly retune when changes occur.

The modification process is implemented in parallel logic in gate array 204 along with the detection process. This gate array fetches the A/D samples from the A/D segment in memory 203. It also fetches the found parameters of the other transmitted signal received by the antenna 200. These parameter values found by the identification process for the other transmitted signal were: a frequency of 200.1 MHz, an amplitude of 166.7 A/D units, a starting phase at the A/D offset of $0.1989\pi$, and a phase increment of $0.5685\pi$. It may be convenient to create a sine function table to be stored in the gate array's 204 internal memory. It may be sufficient to index this table with two digits, where, for example, the $0.1989\pi$ starting phase could return 0.588, as sine $(0.20\times\pi)=0.588$, where 0.20 would be the closest entry to 0.1989. The A/D samples are modified in real time with three (3) math operations, which include: (1) getting a new sine index from a prior index by adding an increment, (2) multiplying the sine table value having the new index with the amplitude of the other transmitted signal, and (3) subtracting this product (i.e., step 2) from the raw A/D sample. The result is the modified A/D. The FIG. 4 first raw A/D sample was 277, the second was 220, the third was −325, and the fourth was −158. For example, applying the three (3) above-described math steps to modify these A/D samples is as follows:

First (1) initial starting phase is $0.1989\pi$ and there is no prior index value to add
  (2) multiply sine table value (i.e., 0.588) of sine $(0.20\times\pi)$ with amplitude of 166.7=98
  (3) Raw A/D value of: 277−98=179 as first modified A/D
Second (1) add prior index of 0.1989 to the 0.5685 increment to produce new index=0.7674
  (2) multiply sine table value (i.e., 0.661) of sine $(0.77\times\pi)$ with amplitude of 166.7=110
  (3) Raw A/D value of: 220−110=110 as second modified A/D
Third (1) add prior index of 0.7674 to the 0.5685 increment to produce new index=1.3359
  (2) multiply sine table value (i.e., −0.876) of sine $(1.34\times\pi)$ with amplitude 166.7=−146
  (3) Raw A/D value of: −325−(−146)=−179 as third modified A/D
Fourth (1) add prior index of 1.3359 to the 0.5685 increment to produce new index=1.9044
  (2) multiply sine table value (i.e., −0.309) of sine $(1.90\times\pi)$ with amplitude 166.7=−52
  (3) Raw A/D value of: −158−(−52)=−106 as fourth modified A/D The precise math for using the 0.078 A/D offset found by the identification process would have yielded modified A/D sample values of 180 (close to 179), 108 (close to 110), −180 (close to −179) and −106 (close to −108). However, in the interest or processing speed, indexing a sine table rather than computing sine values each time has yielded essentially the same modified values which will map in a likelihood table to the 210 amplitude state for the first 2 cells of FIG. 4. The modified A/D values will always vary around the nominal most likely values for a cell area level, due to noise, the quantized A/D's, and the table look ups.

In the FIG. 4 example, based upon the found A/D offset position of 0.078, the level 3 (i.e., the 210 amplitude) most likely A/D values were 180 and 108, the most likely values for level 2 (i.e., the 180 amplitude) were 154 and 93, and for level 1 (150 amplitude), the most likely values were 129 and 77. The internal likelihood memory segment in gate array 204 will store tables in layers for the entire range of A/D offsets in the full range of −0.25 early to +0.25, at discrete increments. Thus, the table layer closest to the current offset will be used. The likelihood table is indexed by the pair of modified A/D values, as calculated above. The memory byte indexed by 180 and 108 would contain a '3', for the high area corresponding to level 3. But so would all other nearby A/D index locations. For example, the memory byte indexed by modified A/D's 170 and 115 would also contain a 3, as it would be most likely. The memory byte accessed by 120 and 83 would contain a 1, for coding level 1, as it is nearest to the level 1 nominals of 129 and 77 for offset layer 0.078. Close clusters are easy to declare most likely, while boundary combinations can be chosen by simulations or from operational experience. The advantage of pre-storing likelihood tables is the provision of requisite processing speed for higher frequency directly coded carrier wave signal transmissions, particularly since real time logic is involved and no real time computations needed. For simplicity it was assumed that the likelihood table was built at an amplitude scale of 210 in order to match the FIG. 4 graphic scale. Under other operational scenarios, however, a proportioning will be needed. The identification process found the amplitude value to be 210 in the example shown in FIG. 4. If, however, the likelihood table was built for an amplitude value of 300, then each A/D value would be proportioned by being multiplying by 300/210=1.4285. This adjusts the A/D samples to the likelihood table scale. The multiplication would be an initial step in the modification process. Thus, the A/D samples to be modified by subtracting out other transmitted signal contributions, would actual have been adjusted A/D samples.

Each cell alternates in sign, so carrying a minus sign is unnecessary as the coding is plus/minus symmetric by design. Memory size can be managed for the stored likelihoods. For example, a 200 byte by 200 byte memory size may be chosen instead of a maximum of 512 byte by 512 byte. While arbitrary, this chosen design memory size is 40,000 bytes for each offset layer. In order to use this reduced size, we would need to proportionally scale the A/D sample values. For example, if 225 was considered the highest possible modified A/D value then the scaling factor would be 200/225=0.8889. Applying this scaling factor to the values associated with the received signal of FIG. 4, the header amplitude values of 180 would now have an index of 144 and the 108 amplitude value would have an index of 96. Therefore, the largest index value in gate array 204 would be 200 for the first and the second A/D sample indices. This provides a possible scaling for memory size management. It will be appreciated that many possible memory sizes and table layer increments are possible.

The cell coding level index by the two modified A/D samples will then be logic mapped to a corresponding symbol, as per the designated signal design. The symbols are then logic mapped to data-bits for output to the interface 205. However, prior to outputting these data-bits, if the symbols are DC balanced, they are provided as output data-bits to the interface. However, if a symbol is not DC balanced, then an error is flagged in real time for corrective action in the transceiver. Corrective action may include, among other things, the receiver 20 (FIG. 2) requesting a retransmission form the transmitter 10 (FIG. 1), or initiating error correction processing. In a preferred embodiment, the processor device 202 utilized within the receiver device 20 (FIG. 2) is a multi-core processor capable of using different cores to execute the various processes (see FIG. 5).

It is to be understood that the present invention can be implemented in various forms of hardware, software, firmware, special purpose processes, or a combination thereof. In one embodiment, at least parts of the present invention can be implemented in software tangibly embodied on a computer readable program storage device. The application program can be downloaded to, and executed by, any device comprising a suitable architecture. Moreover, the transmitter and receiver embodiments of the present invention may also be applied to wired communication systems utilizing communication media such as, but not limited to, coaxial cable, fiber-optic, and/or twisted pair.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A transmitter comprising:
   an oscillator operable to generate a clock signal;
   a mapping unit operable to map received data-bits to symbols and designate each of the symbols as at least three signal coding levels, each of the signal coding levels represented by a plurality of digital codes, wherein the at least three signal coding levels representing each symbol include a plurality of peak amplitudes;
   a digital to analog convertor operable to convert the plurality of digital codes to a corresponding plurality of analog amplitude levels at a rate determined by the clock signal, wherein the analog amplitude levels generate a signal coding level; and
   a filter operable to smooth the plurality of analog amplitude levels and generate a modulated carrier wave that is coded by the symbols.

2. The transmitter of claim 1, wherein zero crossing points at intervals between each signal coding level is constant.

3. The transmitter of claim 2, wherein each of the signal coding levels comprise a half cycle of the modulated carrier wave at a defined frequency.

4. The transmitter of claim 3, wherein each of the signal coding levels comprise one of a plurality coding areas, the plurality of coding areas each designated by a predefined amplitude.

5. The transmitter of claim 1 further comprising an amplifier operable to amplify the modulated carrier wave that is coded by the symbols.

6. The transmitter of claim 1 further comprising an input interface operable to transfer the data-bits to the mapping unit under synchronization of the oscillator.

7. The transmitter of claim 1, further comprising an antenna operable to transmit the modulated carrier wave.

8. The transmitter of claim 1, wherein the symbols are DC balanced.

9. A method of transmitting data by an antenna, the method comprising:
   generating a clock signal;
   mapping the data to symbols;
   designating each of the symbols as at least three signal coding levels;
   representing each of the signal coding levels by a plurality of digital codes, wherein the at least three signal coding levels representing each symbol include a plurality of peak amplitudes;
   converting the plurality of digital codes to a corresponding plurality of analog amplitude levels at a rate determined by the generated clock signal;
   generating a signal coding level based on the plurality of analog amplitude levels; and
   filtering the plurality of analog amplitude levels for generating a modulated carrier wave that is coded by the symbols.

10. The method of claim 9, wherein zero crossing points at intervals between each signal coding level is constant.

11. The method of claim 10, wherein the signal coding level comprises a half cycle of the modulated carrier wave at a defined frequency.

12. The method of claim 11, wherein the signal coding level comprises one of a plurality coding areas, the plurality coding areas each designated by a predefined amplitude.

13. The method of claim 7, further comprising transmitting the modulated carrier wave via the antenna.

14. The method of claim 9, wherein the symbols are DC balanced.

* * * * *